United States Patent [19]

Leclercq et al.

[11] Patent Number: 4,645,642

[45] Date of Patent: Feb. 24, 1987

[54] HOLD DOWN DEVICE FOR A NUCLEAR REACTOR

[75] Inventors: Joseph Leclercq, Saint Didier au Mont D'or; Michel Bonnamour, Lyons, both of France

[73] Assignee: Fragema, Courbevoie, France

[21] Appl. No.: 596,951

[22] Filed: Apr. 5, 1984

[30] Foreign Application Priority Data

Apr. 13, 1983 [FR] France ................................ 83 06033

[51] Int. Cl.⁴ ................................................ G21C 1/01
[52] U.S. Cl. ...................................... 376/364; 376/178
[58] Field of Search ................ 376/352, 362, 364, 178

[56] References Cited

U.S. PATENT DOCUMENTS

| | | | |
|---|---|---|---|
| 2,982,713 | 5/1961 | Sankovich et al. | 376/364 |
| 3,169,097 | 2/1965 | Meyers | 376/352 |
| 3,356,578 | 12/1967 | Dryland et al. | 376/362 |
| 3,669,834 | 6/1972 | Klumb | 376/352 |
| 4,017,357 | 4/1977 | Patterson, Jr. | 376/352 |
| 4,269,661 | 5/1981 | Kmonk et al. | 376/352 |
| 4,304,631 | 12/1981 | Walton et al. | 376/364 |
| 4,427,624 | 1/1984 | Marlatt et al. | 376/352 |

FOREIGN PATENT DOCUMENTS 1075231  2/1960  Fed. Rep. of Germany ...... 376/364

Primary Examiner—Deborah L. Kyle
Assistant Examiner—Richard W. Wendtland
Attorney, Agent, or Firm—Pollock, Vande Sande & Priddy

[57] ABSTRACT

A hold down device for a nuclear reactor of the type in which a plurality of assemblies are disposed between an upper plate and a lower plate, which hold down device comprises a member having at least two resilient means, for example leaf springs which, when the device is placed between the top of a first fuel assembly and the upper plate, and downward pressure is applied to the member, are applied against fuel assemblies adjacent the first fuel assembly.

10 Claims, 9 Drawing Figures

HOLD DOWN DEVICE FOR A NUCLEAR REACTOR

FIELD OF THE INVENTION

1. Background of the Invention

The invention relates to hold-down devices for nuclear reactors of the kind comprising packed fuel assemblies forming the reactor core.

The problem of retaining fuel assemblies subjected to the generally upward forces exerted by the flow of cooling fluid arose in practice with the construction of the very first reactors and became more acute as power increased, with consequent increase in flow rates. Very different means have been suggested for retaining the assemblies in place. The problem is complicated by the fact that the assemblies undergo dimensional changes during the time they spend in the reactor, so that two adjacent fuel assemblies may have appreciably different lengths. At present, the method used by all constructors of water moderated and cooled nuclear reactors comprises placing the fuel assemblies on a bottom core support plate which is formed with apertures through which the coolant flows. Resilient elements are disposed between the top end fitting of each assembly and a top plate of the core. The resilient elements bear against the top plate of the core and bias the assemblies towards the bottom plate of the core and against the thrust exerted by the cooling fluid.

In general, the resilient elements are integrated with the assembly. They can take the form of resilient strips having an end with a link for attachment to the top fitting, and a free end adapted to bear against the top plate of the core. The resilient elements can be formed by springs operating in torsion and flexion (see, e.g., French Pat. No. 2,326,010) and borne by the top fitting of the assembly. They can also be interposed between a bush integral with the top fitting of the assembly and a sliding pad biased against the top plate of the core (see, e.g., French Pat. No. 2,409,576).

All these methods have disadvantages. More particularly, they increase the complexity of the fuel assembly. Their deterioration under irradiation means that complex servicing must be performed on those irradiated assemblies which are to be reused in the reactor. Alternately the irradiated fuel assemblies must be discarded. The space occupied by the springs and the over-dimensioning of the top end fitting which they necessitate restricts the flow section of the cooling fluid. Variations in the length of the assemblies make it difficult to provide springs capable of biasing the assemblies against the bottom core support plate in all circumstances. Lastly, the springs may impede the introduction of a handling grab into the top fitting of the assembly.

SUMMARY OF THE INVENTION

It is an object of the invention to provide a hold-down device which meets practical requirements more satisfactorily that the prior art constructions.

According to the present invention, there is provided a hold down device for a nuclear reactor of the type in which a plurality of assemblies are disposed between an upper plate and a lower plate, which hold down device comprises a member having at least two resilient means which, when said device is place between the top of a first fuel assembly and said upper plate and downward pressure is applied to said member, are applied against fuel assemblies adjacent said first fuel assembly.

Preferably, said resilient means comprises a leaf spring.

Advantageously said member comprises a first portion which, in use, bears against said first fuel assembly, and a second portion which is slidably mounted on said first portion and is provided with said resilient means. Preferably, said hold down device includes a spring biasing said first portion and said second portion apart. The arrangement is preferably such that movement of said first portion towards said second portion causes said resilient means to spread outwardly. In one embodiment, one of said first portion and said second portion is provided with a key and the other with a slot so shaped that, when said first portion is moved towards said second portion, said first portion rotates with respect to said second portion. In another embodiment, said first portion and said second portion can be moved towards one another along a first axis, said resilient means are pivotally mounted on respective shafts perpendicular to said first axis, and means are provided so that when said first portion is moved towards said second portion said resilient means pivot about their shafts and spread outwardly from said first axis. This embodiment preferably includes a spring arranged to bias said resilient means to a retracted position adjacent said first axis.

The present invention also provides a nuclear reactor comprising a plurality of fuel assemblies disposed between an upper plate and a lower plate and at least one hold down device in accordance with the invention disposed between the upper plate and the fuel assemblies.

Preferably, the resilient means are wholly contained within the boundary of a first fuel assembly prior to downward pressure being applied to said member.

BRIEF DESCRIPTION OF THE DRAWINGS

The invention will be more clearly understood from the following description of particular exemplary embodiments. The description refers to the accompanying drawings in which.

The invention will be mainly described in its application to nuclear reactor fuel assemblies of the kind disclosed in French Pat. No. 1,536,257, except that the top end fitting can, according to the invention, be a tubular adapter plate having guide tubes and a handling attachment. This patent discloses an assembly formed by a cluster of rods containing fissile material and supported by a frame to form an assembly of square cross-section. The frame is formed by top and bottom end members formed with apertures through which the cooling fluid flows and connected via tubes which ensure the cohesion and mechanical rigidity of the assembly. By their juxtaposition, the assemblies form the reactor core. They rest on a bottom core support plate which is also provided with apertures through which the cooling fluid flows. Disposed above the assemblies is a core plate formed with apertures for the discharge of the hot fluid.

In certain core assemblies the tubes are adapted to receive rods which contain a neutron absorbent and are required for controlling the reactivity of the core. All the rods of the same assembly form a cluster which can be displaced in one block by a member usually called a "spider". The tubes of other assemblies are provided to receive clusters of elements which cannot be displaced during operation, such as rods containing a consumable poison used to control excess reactivity of the core, plugs whose purpose is to close the ends of the unused tubes, or neutron sources which enable the reactor to go critical.

Figure 1:
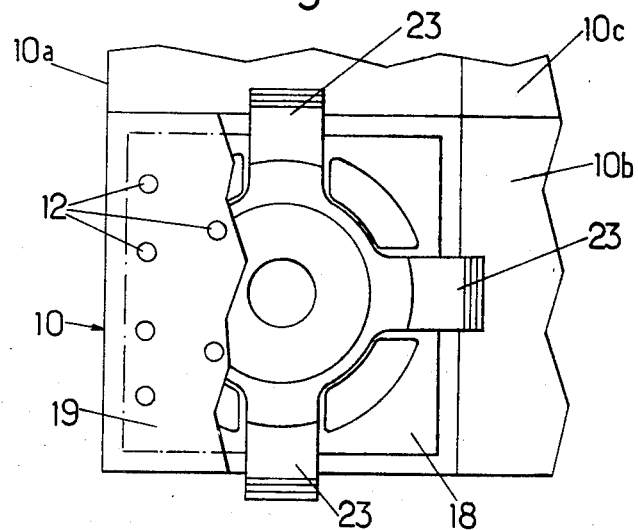
FIG. 1 is a partially sectioned plan view showing a hold-down device disposed on an assembly.

FIG. 1 is a plan view showing an assembly 10 whose guide tubes 12 will be supported to be adapted to receive fixed elements, and a fraction of three adjacent elements 10a, 10b and 10c, the assemblies 10a and 10b being adapted to receive the movable rods of control clusters (not shown). The assemblies can have the general construction disclosed in the already cited French Pat. No. 1,536,257, except for the top end fitting.

Figure 2:
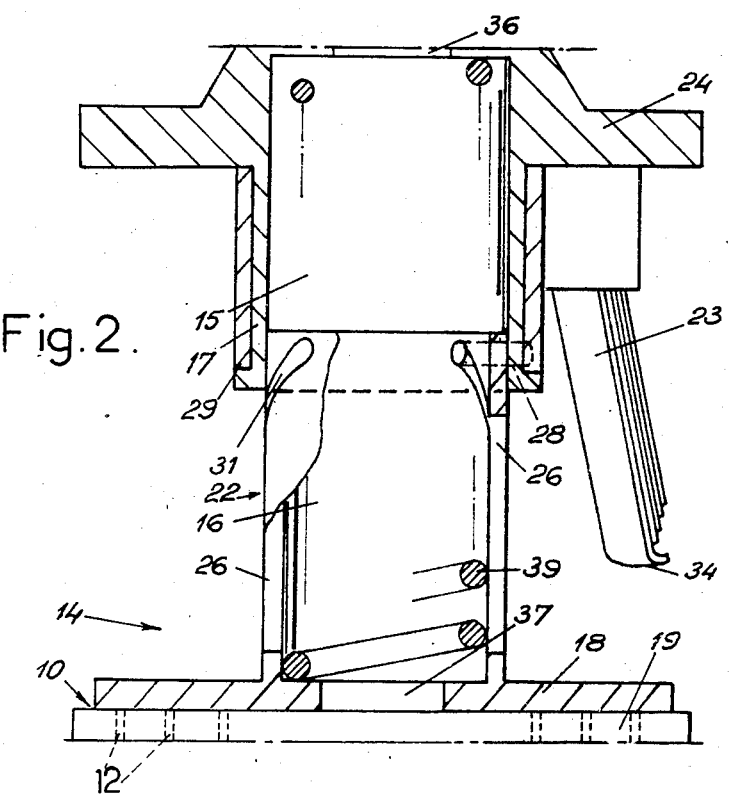
FIG. 2 is a sectional view of the device ilustrated in FIG. 1, the members being shown in the position which they occupy during introduction.
Figure 3:
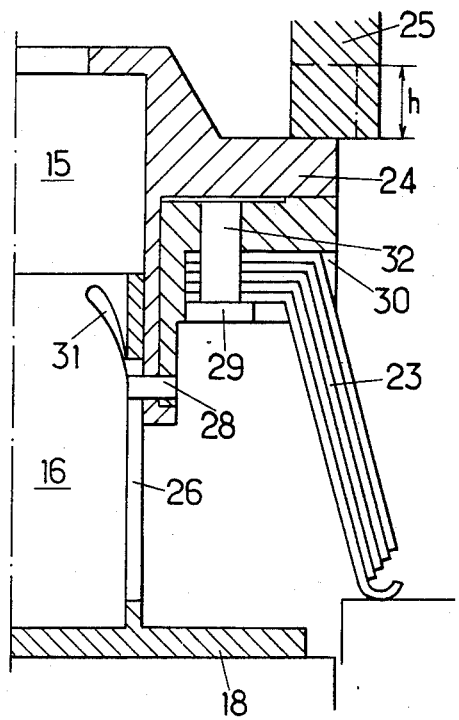

The assembly 10 illustrated in FIGS. 1 to 3 is provided with a member 14 having both resilient means adapted to participate in holding down the adjacent elements 10a and 10b, and elements which are not displaceable during operation and which will be supposed to be closure plugs for the tubes 12. For this reason the member 14 will now be called a "spider", because of its shape. The spider 14 bears a cluster of plugs so distributed as to be introduced into the guide tubes 12 distributed in the network of fuel rods (FIG. 2).

FIG. 2 shows the spider in the position which it occupies on the termination of the introduction of the plugs into the assembly 10. The spider 14 comprises two generally cylindrical coaxial portions 15 and 16, mounted to rub gently against one another so that they can slide vertically. The lower portion 16 has a base 18 to which the plugs (not shown) are attached which are adapted to engage in the guide tubes 12. On termination of the introduction, the base 18 comes to rest on the top adapter member 19 of the assembly 10.

The top part 15 of the spider has a casing 17 whose internal cylindrical surface is adapted to slide with gentle friction on a tubular portion 22 of the lower portion 16. The portion 15 has springs 23 adapted to bear against the adjacent fuel assemblies, as 10a and 10b. To simplify matters, FIG. 2 shows only one spring 23. However, the spider can comprise any number of springs between one and four, in dependence on the number of adjacent fuel assemblies to be retained. The springs 23 are carried by a flange 24 whose flat top surface bears against the top plate 25 of the core (FIG. 3). Under the force of the plate 25 the upper portion 15 is displaced downwards in relation to the lower portion 16. During such displacement, the casing 17 of the top portion 15 is guided by means for orienting the two portions in relation to one another. In the embodiment illustrated in FIGS. 2 and 3, these means comprise a number of slots 26 which are produced in the tubular part of the lower portion 16 and are regularly distributed angularly around the vertical axis of the spider, each of the slots 26 cooperating with a pin 28 connected fast to the casing 17 to form a sliding key. The pins 28 can at the same time connect the casing 17 fast to a sleeve 29 which encloses the casing and has recesses 30 for receiving and positioning the springs 23, which are attached to the sleeve 29, for example, by screws 32.

FIGS. 2 and 3 show how the slots 26 are rectilinear and parallel with the axis in their lower portion over about three-quarters of their length. However, the upper portion 31 of the slot is helical, so that the thrusting down of the upper portion 15 from the top position (as shown in FIG. 2) causes a rotation of the upper portion 15 which, in the case of an assembly of square section, will be of the order of 45°.

The spider 14 is put in place on an assembly by using a conventional handling tool which can, for example, seize the upper portion 15. When the base 18 contacts the top adapter member 19, the elements are in the position shown in FIG. 2. Then, when a downwardly directed axial thrust is exerted on the upper portion 15, for example, by the top plate 25, the upper portion 15 descends and simultaneously rotates. The springs, which in their initial position do not extend beyond the plan dimensions of the fuel assembly 10 (FIG. 2), assume a fresh orientation, in which they are disposed symmetrically in relation to the central plane or the adjacent assemblies (FIGS. 1 and 3). The contact zone 34 of a first spring abuts the top adapter member of that adjacent assembly, 10b, for example, whose plate is highest (FIG. 3). Then, as the downward displacement of the top member continues, the other springs move into abutment in their turn.

Figure 4:
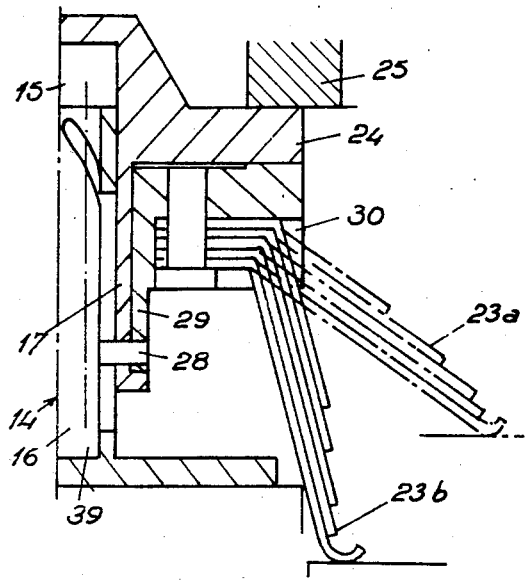
FIGS. 3 and 4, which are similar to FIG. 2, are half-sections showing the arrangement adopted by the components when the springs contact the adjacent elements.

When the core plate 25 has descended to its final position, all the springs 23 retain the assemblies against which they bear. FIG. 4 shows two end conditions which a spring can assume. The condition indicated at 23a (shown in chain—dot lines) corresponds to the maintenance of an assembly which has gone through several cycles and an enlargement which gives it a longitudinal dimension greater than that of the assembly 10. At 23b the solid lines correspond to the case of a brand new assembly, while the assembly 10 has itself undergone some enlargement during a preceding cycle.

Figure 5:
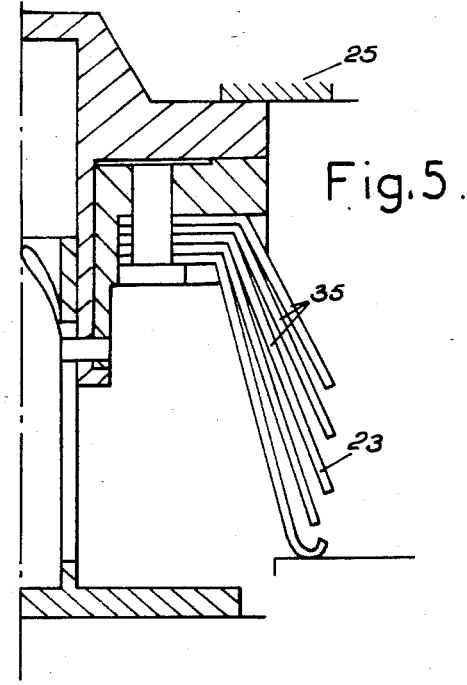
FIG. 5, which is similar to FIG. 3, shows an alternative embodiment of the springs.

FIG. 5, which is similar to FIG. 4, shows an embodiment in which the spring 23 is again formed by a number of leaves, but which are separated when the spring is free, while the leaves 35 join up in the embodiment illustrated in FIGS. 2 to 4. In this way the action of the spring 23 is made more progressive. Moreover, this compensates for the increase in the lever arm of the bearing force on the spring. In the initial position of the spring 23, shown in solid lines in FIG. 5, the leaf in contact is very stiff, since it makes only a small angle with the vertical. Its stiffness diminishes as a result of the increase in the camber as the leaf bends. However, the reduction in the force is compensated by the action of the succeeding leaf, and so on.

The spider can also be provided to hold down the assembly 10 on which it is mounted. To this end it is sufficient to dispose a compression spring between the portions 15 and 16. In the embodiment illustrated in FIG. 2, the spring 39 is disposed in the central portion of the spider 14, between the two end flanges which are associated with the upper portion 15 and the lower portion 16, respectively. The spring also tends to move the two portions into the relative arrangement shown in FIG. 2 during handling—i.e., to maintain the springs 23 in the retracted position. The internal bearing flanges for the spring 39 leave central apertures 36 and 37 for the flow of the coolant to the core outlet. Further apertures are advantageously provided in the flange 24 in order to provide a greater flow section. The apertures can be large enough for the load at the outlet from each assembly to be clearly lower than in assemblies having conventional hold-down devices, all the more so in that the top adapter member of the assembly is clearly lighter.

Figure 6:
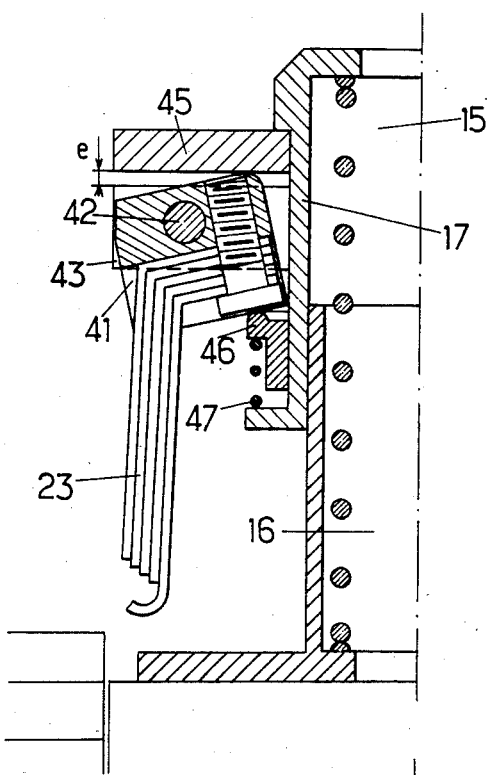
FIGS. 6 and 7, similar to FIGS. 2 and 3, show alternative embodiment of the components.
Figure 7:
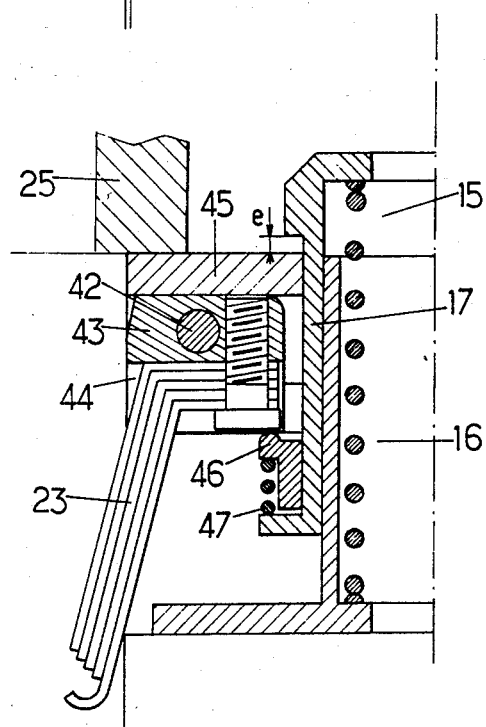

In the alternative embodiment illustrated in FIGS. 6 and 7, in which like members to those in the preceding drawings have like references, the springs are displaced between the spread-out position and the contacted position not by the relative rotation of the portion 15 and 16, but by tilting around an axis perpendicular to the longitudinal axis of the spider. Each of the springs 23 is carried by a member 41 having a spindle 42 whose ends engage in a rim 43 connected fast to the casing 17. The spindle forms an axis of rotation at right angles to the axis of the spider 14. A ring 45 is slidably mounted on the casing 17 between the rim 43 and an end shoulder of the casing. An annular pusher 46 mounted on the casing 17 bears against the members 41 under the force of a compression spring 47. The pusher tends to make the members 43 tilt by urging the ring 45 into the abutment position in which it is shown in FIG. 6. The amplitude of the movement e of the ring 45 between these two end positions in such that when the ring 45 is brought into abutment against the rim 43, it makes the members 41 tilt enough to cause the springs to project, as shown in FIG. 7. The tilting takes place under the course of the downward thrust of the top plate 25 of the core. The ring 45 and the rim 43 can be perforated to faciliate the flow of coolant.

Figure 8:
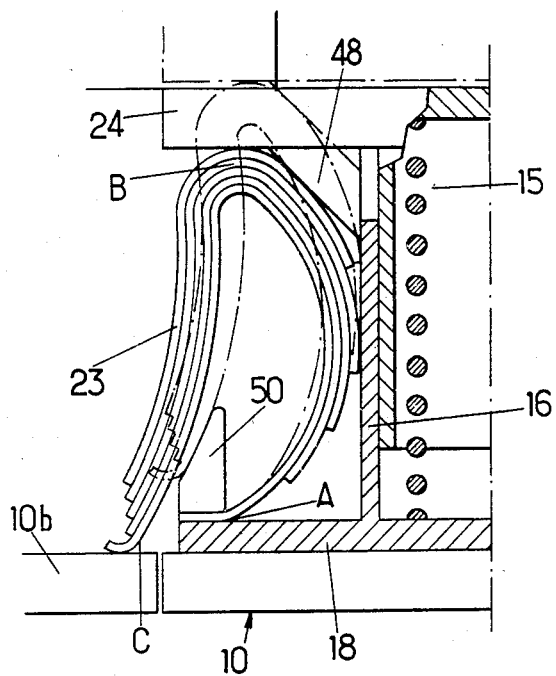
FIGS. 8 and 9 show diagrammatically two other possible embodiments of the invention.
Figure 9:
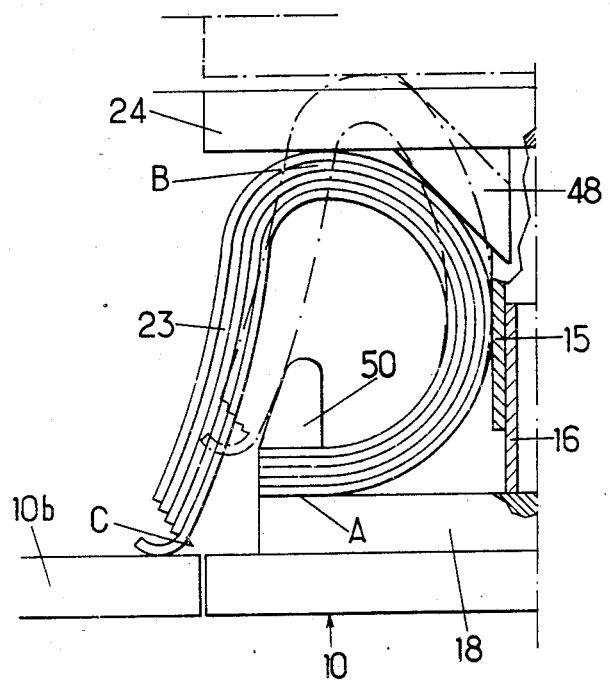

In the alternative embodiment illustrated in FIGS. 8 and 9, the springs 23 are displaced from the retracted position into the spread position above the adjacent assemblies by deformation when the portions 15 and 16 approach. The springs 23 are shown in the form of a set of folded leaves which are staggered (FIG. 8) or of equal length (FIG. 9), one end of the springs being attached to the plate 18 carrying the rods.

In FIG. 8, for example, the free position of one of the springs 23 is shown in chain-dot lines. The upper portion 15 has wedges 48 disposed in line with the top bend of the springs. The wedges are lowered at the same time as the portion 15 and pass into slots which are provided in the lower portion 16 for this purpose. The wedges progressively move the springs 23 out of the position shown in chain-dot lines into the position necessary for taking up the difference in height between the assembly 10 and the adjacent assembly 10b to be retained.

To enable the spring 23 to be positioned immediately on the adjacent assembly 10b, a heel having a chamfered surface 50 guides the inner leaf of the spring 23.

Advantageously the heels have a bore receiving a device for locking the leaves of the spring 23 on the member 18. The locking device can be formed by a screw comprising a casing whose deformation in grooves with which the bore is formed enables the screw to be locked during rotation, so that it cannot be lost.

In this variant the hold-down function is ensured solely by deformation (i.e., without the spring assembly pivoting or tilting) of the assembly of leaves which operates by bending between the reference places A and B, the points of contact of the spring and of the portions 16 and 15 respectively, and acts as a lever arm between the reference places B and C, the points of contact of the portion 15 receiving the thrust of 24 and of the adjacent assembly respectively.

Since the zone bounded by A and B operates by bending, the zone bounded by BC is completely retracted when the portions 15 and 16 are moved away from one another—i.e. when no thrust is exerted on 15; in that case the springs 23 do not extend between the plan dimensions of the fitted fuel assembly.

Similarly, in this position the heels 49 obviate the risk that the portion BC will be displaced towards the inside of the loop AB.

Clearly, the invention obviates the disadvantages caused in the prior art handling of fuel assemblies by springs carried by the top end fittings, enables better utilization to be made of the springs, whose life is not bound up with the life of the assemblies, allows any damaged springs to be quickly replaced, and obviates the problem of replacing damaged springs on assemblies to be reintroduced into the reactor. The invention has an extra advantage as regards the possible arrangement of the guide tubes, since in the prior art assemblies the space occupied by the top end fittings prevents the guide tubes from being disposed immediately adjacent the periphery of the assembly. To a large extent the invention removes this limitation and enables the guide tubes to be brought close to the periphery of the assembly; this enables the neutron flow in the reactor to be homogenized, by allowing the anti-reactivity of the rods in the control clusters to be exerted much more on the adjacent assemblies fitted with clusters of plugs. This increased efficiency on the adjacent assemblies may enable the number of control clusters required to be reduced.

If the space lying between the top end of the assemblies is to be made as small as possible, the top plate 25 of the core can be indented, as shown in chain-dot lines in FIG. 3. In this way the level of the core plate on which the hold-down force is exerted can be lowered by h. This change in level enables the active height of fuel to be increased for an equal space occupied by the basin, or the basin height to be reduced for an equal active height. The same result might be achieved by a staircase-shaped flange 24 or the use of levers.

We claim:

1. In a nuclear reactor having an upper core plate, a lower core plate and a plurality of fuel assemblies disposed in mutually adjacent relation between said upper core plate and said lower core plate including first fuel assemblies separated by second fuel assemblies, a hold down device for each of said first fuel assemblies comprising means slidably received on said first assembly for vertical movement and arranged for abutment by said upper core plate, first resilient means between said first means and said fuel assembly for transmission of a hold down force from said upper core plate to said first fuel assembly, and at least two sets of second resilient means mechanically connected to said slidable means and each arranged to transmit a hold down force from said slidable means to one of said second fuel assemblies which is adjacent to the first fuel assembly provided with the hold down device.

2. A hold down device according to claim 1, wherein said second resilient means consists of leaf springs.

3. In a nuclear reactor having an upper core plate, a lower core plate and a plurality of vertically arranged fuel assemblies disposed in mutually adjacent relation between said upper core plate and said lower core plate and resting on said lower core plate, a hold down device comprising a first member securely connected to an upper portion of a first one of said fuel assemblies, a second member mounted for vertical movement on said first member, first resilient means between said first member and second member for urging said second member upwardly into abutment with said upper core plate, and second resilient means carried by said second member, said second resilient means and second member being arranged for said resilient means to spread apart into abutment against at least two others of said fuel assemblies which are adjacent to said first fuel assembly upon downward movement of said second member by said upper core plate, whereby a hold down force is transmitted from said upper core plate to said first assembly and said two other fuel assemblies upon downward movement of said upper core plate onto said fuel assemblies.

4. A hold down device according to claim 3, wherein said first member and second member are tubular and slidably received upon each other and said first resilient means includes a helical spring located radially inwardly of said first and second tubular members.

5. A hold down device according to claim 4, wherein said first member and said second member are constructed and arranged for relative vertical movement of said members against the action of said spring means to cause spreading of said sets of resilient means.

6. A hold down device according to claim 3, wherein one of said first member and said second member is provided with key means and the other with slot means so shaped to cause rotation of said first member rotates with respect to said second member about a vertical axis upon downward movement of said first member.

7. A hold down device according to claim 3, wherein said resilient means comprises at least two sets of springs each pivotally mounted for rotation about a respective horizontal axis of said second member and means are provided which forcibly rotate said resilient means about the axis thereof and spread said resilient means outwardly away from said vertical axis upon downward movement of said first member with respect to said second member.

8. A hold down device according to claim 1 wherein said resilient means are wholly contained within a space having a cross-section equal to the horizontal cross-sectional area of said first fuel assembly when said hold down device is in free condition.

9. In a nuclear reactor comprising a plurality of mutually adjacent fuel assemblies disposed between an upper core plate and a lower core plate, a plurality of hold down devices carried by first of said fuel assemblies, each of said hold down devices having a first member arranged for being fixed to an associated one of said first fuel assemblies, a second member arranged for being axially movable with respect to said first member and arranged for receiving downwardly directed force from said upper core plate and at least two sets of resiliently deformable means each connected to one of said first and second members and arranged for abutting a second fuel assembly among said fuel assemblies which is adjacent to said one of the first fuel assemblies upon application of a downward force by said upper plate to said second member and downward movement thereof.

10. For use in a nuclear reactor having an upper core plate, a lower core plate, a plurality of nuclear fuel assemblies disposed in mutually adjacent relation between said upper core plate and said lower core plate, a hold down device for cooperation with a first one of said fuel assemblies and having a plurality of resilient means constructed and arranged to apply downwardly directed hold down forces to a plurality of fuel assemblies adjacent to said first fuel assembly when said hold down device is placed between a top portion of said first fuel assembly and said upper plate and said upper core plate exerts a downward pressure on said device.

* * * * *